July 29, 1969  H. A. BEALL, JR., ET AL  3,458,709
TIME REFERENCE ANGLE ENCODER USING RADIATION SENSITIVE MEANS
Filed June 24, 1964  4 Sheets-Sheet 1

INVENTORS
HORACE A. BEALL, JR.
JAMES V. CROSS
BY KENNETH P. GOW

ATTORNEY

INVENTORS
HORACE A. BEALL, JR.
JAMES V. CROSS
KENNETH P. GOW
BY

ATTORNEY

United States Patent Office 3,458,709
Patented July 29, 1969

3,458,709
TIME REFERENCE ANGLE ENCODER USING RADIATION SENSITIVE MEANS
Horace A. Beall, Jr., Santa Ana, and James V. Cross and Kenneth P. Gow, Whittier, Calif., assignors to North American Rockwell Corporation, a corporation of Delaware
Filed June 24, 1964, Ser. No. 377,728
Int. Cl. G01d 5/34
U.S. Cl. 250—231          12 Claims

ABSTRACT OF THE DISCLOSURE

An optical system for measuring the angle of a shaft including a disc attached to said shaft containing a pattern of alternately transparent and opaque radial lines around its perimeter. The angular position of the disc is determined by a photocell which monitors the position of the line pattern. Interpolation of position between lines is accomplished by sweeping an image of the radial lines across the photocell with a constant velocity.

This invention pertains to an angle encoder and more particularly to an optical means for measuring the angle of a shaft, or the like.

Precision angle measurements is rapidly becoming one of the limiting factors in the miniaturization of advanced inertial and stellar-inertial navigation systems. Automatic angle transducers are required on platform gimbals, gyrocompass mounts, and especially on telescope pointing structures for celestial tracking.

Present angle measuring devices use mechanical, magnetic, capacitive, or optical techniques to determine the relative orientation of a rotating element with respect to its supporting structure. The optical approach appears to be the most promising in view of the strict requirements on power consumption, accuracy, reliability, producibility, and size. Optical methods offer reduced alignment problems, less cross-talk, and greater accuracy in a size compatible with future inertial and stellar-inertial systems. The advantages of digital controls are rapidly leading to the universal adaption in precision navigation, and the optical transducer described herein lends itself readily for use in digitally controlled systems.

An optical angle transducer consists basically of a glass disc containing a pattern of alternately transparent and opaque radial lines around its perimeter. The angular position of the disc is determined by a photocell which monitors the position of the line pattern relative to the fixed position of the photocell. Such line patterns can be produced with accuracies approaching one second of arc but with rather limited resolution since the line widths must be greater than the wave length of light. But such resolution is far greater than that possible with magnetic, capacitive, or mechanical devices. In addition, optical transducers require only one disc, thereby eliminating the need for precision mounting of two discs. An interpolation technique is therefore required to achieve angular measurement with a finer resolution.

The device of this invention utilizes time measurement for interpolation. The use of time measurement is attractive because time references are usually available in the form of precision digital clocks and because time measurements are conventionally processed by a digital computer. Timing interpolation of the present invention is accomplished by sweeping an image of the radial lines across a photo detector with a constant velocity. The constant velocity sweep can be provided by rotating the disc at a constant velocity or by use of a moving element in the optical system.

The device of this invention consists of an optical code disc, theodolite optical system, and a readout optical system. The code disc and theodolite optics are similar to those used in Moire fringe devices and have the same advantages as far as eccentricity and disc alignments are concerned. For example, see patent application Ser. No. 307,767, now abandoned, filed Sept. 6, 1963, entitled "Motion Detector," by Charles A. Call. In the present novel device a high accuracy, high resolution continuous readout is achieved by interpolation over small increments of angle. The interpolation is accomplished by the insertion of a time axis and the subsequent measuring of the time between two electrical pulses. Through the use of a theodolite optical system, the lines from one side of the code disc are imaged adjacent to the lines on the opposite side of the disc. As the code disc is rotated, the sets of lines from each side of the disc move in opposite directions. The physical spacing between a line in one set and line image in the other set will be proportional to the angular position of the code disc. This physical spacing is converted into a displacement in time by sweeping the image of this pattern across two photocells arranged so that each photocell sees lines from one set only. This results in a two-channel output such that the time between adjacent pulses on alternate channels varies as a function of disc position. The means used to sweep the line images across the photo detectors with a constant velocity consists of a mirror which is mounted to and is mechanically actuated by a piezoelectric bending element. The piezoelectric element is used because of its small size and the extremely low power needed for its operation. But it is obvious that other devices may be utilized to perform the same function such as a motor driven mirror, galvanometer, etc. A system utilizing this scheme of interpolation has some distinct advantages over other systems in that the angular information is not a function of the amplitude of the resulting pulses, hence, the accuracy is not affected by changes in illumination level or photodetector drift, nor do the two photocells have to have matched characteristics. A description of the piezoelectric bending type devices may be found in Susskind, A. K., "Notes on Analog to Digital Conversion Techniques," MIT (page 41) 1957.

It is therefore the principal object of this invention to provide a device to accurately measure angular displacement between two members.

It is a more particular object of this invention to measure the displacement of a moving member to a higher degree of accuracy than that heretofore obtainable.

It is another object of this invention in an angle encoder to provide a device to measure angular displacement while eliminating errors due to the eccentric mounting of the measuring instrument on the member whose displacement is to be measured.

It is also an object of this invention to provide a means to more accurately measure the angle of rotation of a shaft.

It is a specific object of this invention to obtain signals which are precise measures of the angular displacements of angular motion.

It is a more specific object of this invention to provide a machine apparatus which is designed to achieve the above-enumerated objects.

Other objects will become apparent from the following descriptions taken in connection with the accompanying drawings in which.

Figure 1:
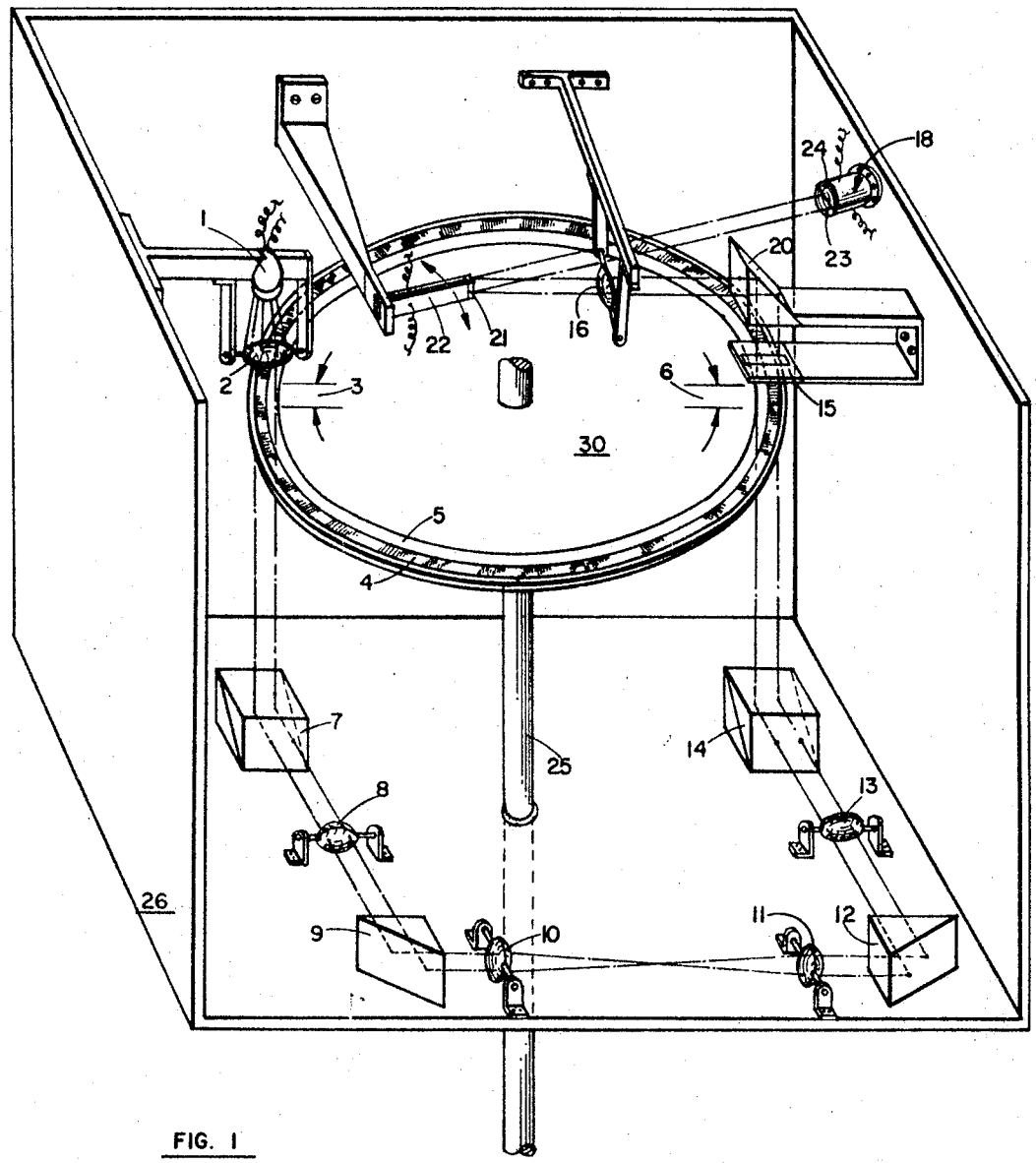
FIG. 1 is a perspective view of a typical angle encoder in accordance with this invention.
Figure 2:
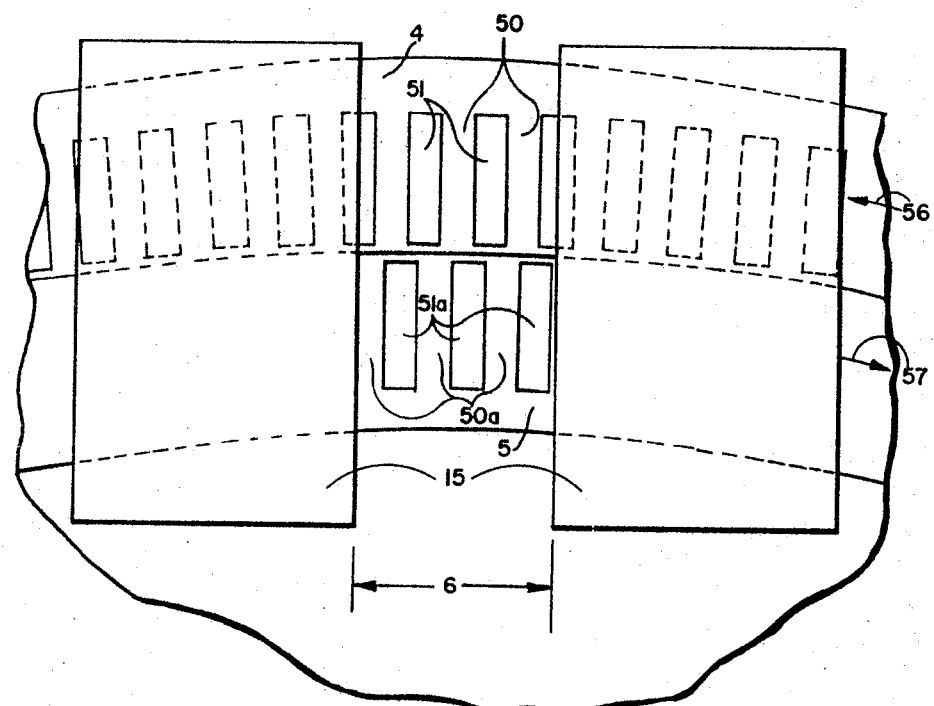
FIG. 2 is a sectional view illustrating a portion of the code disc and the code disc patterns as seen in relation to the mask.

In FIG. 1 a rotatable member 30 is rotatably attached to a supporting structure 26 by a shaft 25. The member 30 is preferably a mechanically balanced member such as a circular disc. On the member 30 there are two circular strips 4 and 5. Strip 5 is transparent to light. Strip 4 is comprised of a periodic structure of alternately opaque and transparent indicia or areas. These areas may also be viewed as being lines of opaque and transparent material. A detailed portion of the strips 4 and 5 is shown in FIG. 2. The boundaries between the opaque and transparent portions are substantially along the radial coordinate of a polar coordinate system. The direction of motion of the strips is along a circumferential or angular coordinate of the polar coordinate system. The alternately opaque and transparent lines or indicia are substantially uniformly and periodically distributed about an axis which is substantially parallel to the axis of rotation of shaft 25.

Figure 3:
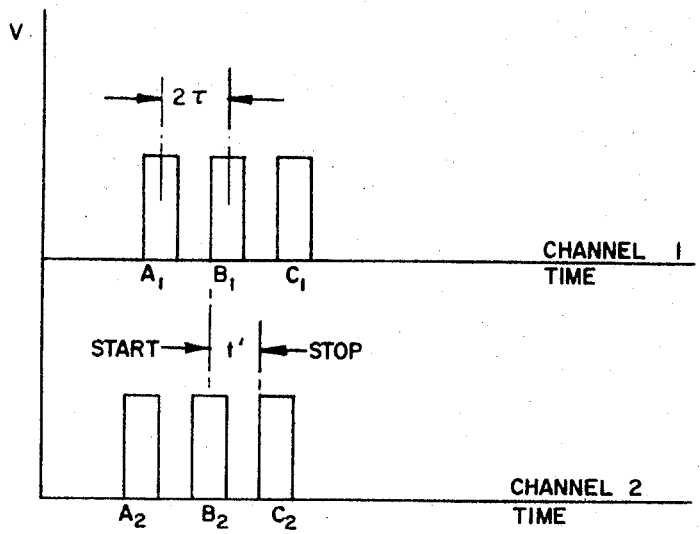
FIG. 3 shows a typical set of waveforms present at the output of the two photo detectors.

A light source 1 through appropriate optical systems, for example, a lens 2, illuminates a portion 3 of strips 4 and 5 to project an optical image of the portion 3. A highly reliable light source that may be used in the present invention is a miniature lamp now being manufactured by the Chicago Miniature Lamp Works. The National Bureau of Standards has estimated the life of these lamps, when operated at 5 volts, to be several billion years. A prism 7 receives the images from the strip portion 3 and transmit the images through a lens 8 to a prism 9. Prism 9 bends the images and transmits them through lenses 10 and 11 which switch the positions of the images and pass them to a prism 12. Prism 12 transmits the images through a lense 13 to a prism 14 which projects the images of portion 3 onto portion 6 of strips 4 and 5. The prism system serves to carry the light from one end of movable disc-like member 30 to the other end around the supporting shaft 25. It is obvious, that if shaft 25 is of the single ended type and does not continue on through disc 30 that the need for prisms 9 and 12 and lenses 10 and 11 no longer will exist. The light from prism 14 projects an image of the opaque areas or lines present on strip 4 from portion 3 onto the transparent strip 5 at portion 6. The transparent areas of strip 4 at portion 6 are also illuminated by source 1 through the optical system. The lines at portion 6 and the image of the lines from portion 3 are shown in FIG. 2. A mask 15 blocks the light from all but a few lines. The light from the lines which are not obscured by the mask enters a prism 20 and is focused by a lens 16 on photocells 23 and 24 via a moving mirror 21. The photo electric devices 23 and 24 may be, for example, photo resistors whose resistances vary about some fixed value of resistance. The image of the lines from portion 6, strip 5, is focused on photocell 24. Rotation of the disc member 30 causes the line images at the photocells 23 and 24 to move in the direction shown in FIG. 2. Mirror 21 is constantly moving so as to sweep the line images across the photocells and thereby generate a series of electrical output pulses. The mirror 21 is mounted to a piezoelectric cantilevered type support 22. The piezoelectric element is connected to a source of AC excitation voltage (oscillator 43 shown in FIG. 5), the frequency of which determines the rate at which the mirror will sweep the line images across the photocells. Magnetic and vibrating reed drivers may be substituted for the piezoelectric element. To achieve linear timing interpolation, the mirror velocity must be constant during the time the line images are being detected by the photocells 23 and 24. The photocell output pulses are shown in FIG. 3. The actual angle interpolation is achieved in the following manner: Mask 15 allows light through from only three lines from strips 4 and 5 at portion 6.

The idealized output from the two photo detectors 23 and 24 would be as shown in FIG. 3. If we let $2\tau$ be the line distance between the centers of two adjacent pulses, this distance will be constant if the image is scanned past the photo detectors at a constant velocity. The time $t'$ is the variable time between the leading edge of a pulse of one channel and the leading edge of the following pulse on the other channel. As the movable disc 30 is rotated the pulses from the photo detectors 23 and 24 will be coincident in time at every increment of angle equal to $\phi$, where $2\phi$ is the angle between centers of two adjacent opaque areas or lines on the movable disc 30. The unknown angle $\psi$ which is interpolated within increments of $\phi$ is found by the linear relationship:

$$\psi = \frac{t'}{\tau}\phi \qquad (1)$$

The angle $\phi$ is determined by the type of disc 30 which is used, as an example for a 13-bit disc, $\phi = 5$ min. 16.41 sec. of arc. To interpolate to an accuracy of 1 sec. of arc, one must measure $t'/\tau$ to 1 part in 316. For a 14-bit disc, which is commercially available, the same accuracy requires interpolation to only be 1 part in 158. As is seen from this, the accuracy of the interpolation process is a function of how constant the mirror motion is.

Strips 4 and 5 at portion 6 are shown in FIG. 2. Strip 4 is comprised of a plurality of opaque areas or lines 51 and transparent areas 50. The transparent and opaque areas alternate and are preferably of the same size with the boundries between the opaque and transparent areas substantially perpendicular to the direction of motion which is shown by arrows 56 and 57. A projected line image of strip 4 at portion 3 is shown as transparent areas 50a and opaque areas 51a illuminating through transparent strip 5 adjacent to strip 4 at position 6. As movable member 30 rotates in the direction shown by arrow 56 the projected lines as viewed through the transparent strip 5 move in an equal manner but in the opposite sense as depicted by the direction arrow 57.

Figure 4:
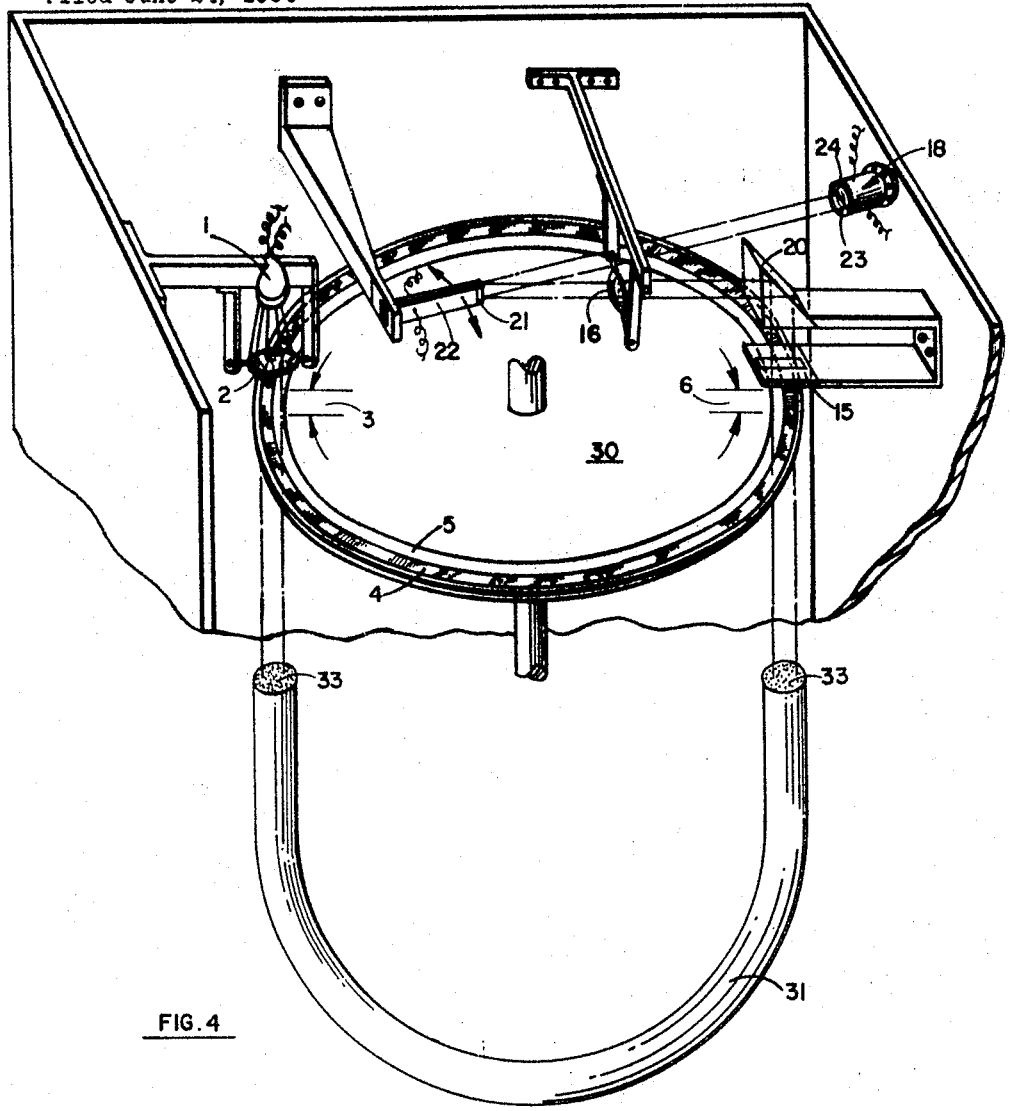
FIG. 4 is the second embodiment of an angle encoder in accordance with this invention using fiber optics to transmit the code disc pattern.

In FIG. 4 a fiber-optical member 31 is positioned adjacent to portion 3 to receive the image of the portion 3 and to transmit the same to the portion 6 of movable disc member 30. The fiber-optical member 31 is a bundle of optical fibers whose relative position on the two end faces 32 and 33 is reversed. Such fiber-optical devices are well known in the prior art. The fiber optical member 31, is preferably rigid but may be flexible. The face 33 of fiber-optical member 31 is positioned adjacent to portion 6 of circular member 30 to project the line images from strip 4 at portion 3 to portion 6 on strip 5 and to project the light illumination from transparent strip 5 at portion 3 to the line images on strip 4 at portion 6. The face 32 is positioned adjacent portion 3 to receive the light images transmitted there.

Figure 5:
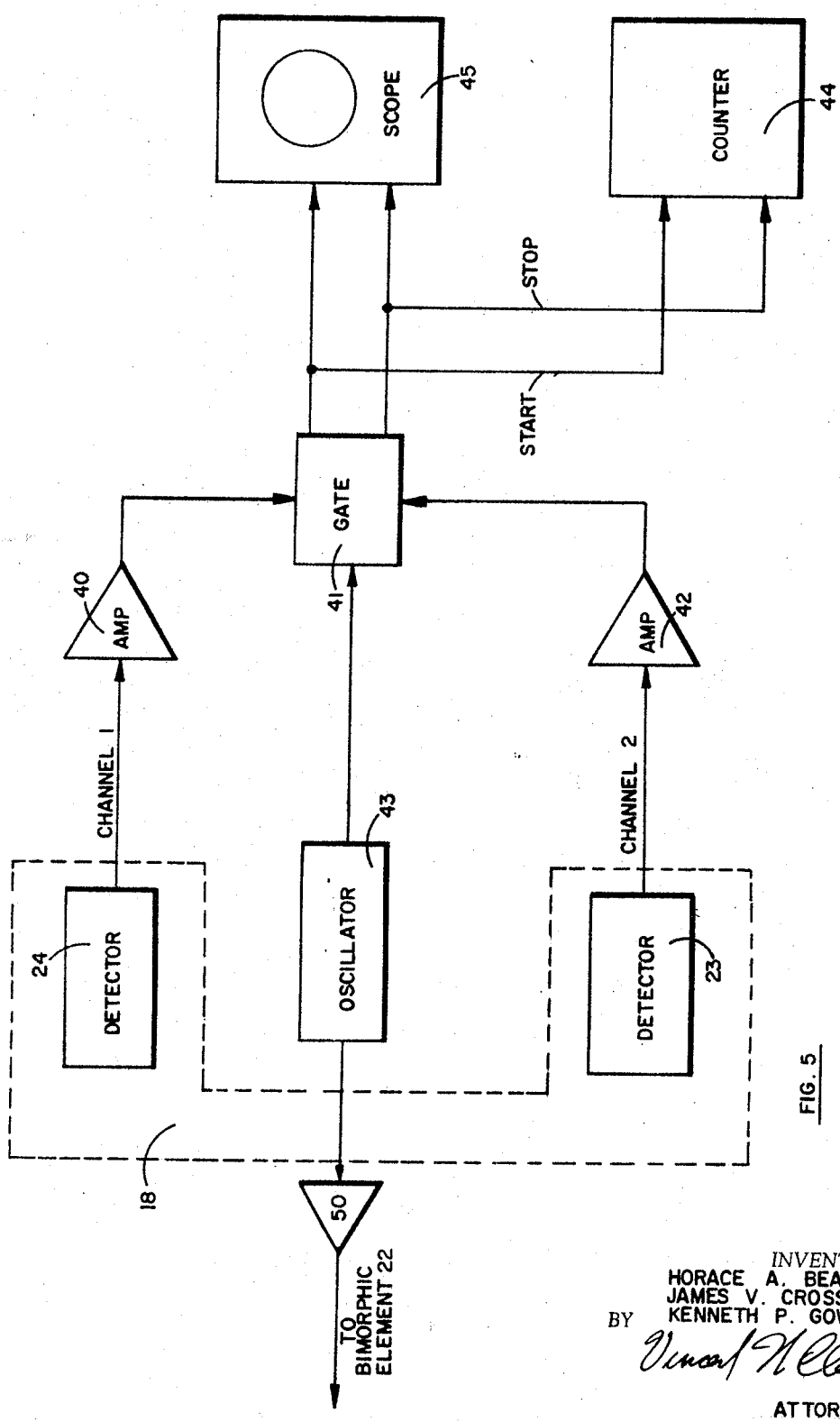
FIG. 5 is a block diagram of a typical circuit for generating electrical signals which are a measure of the angle of rotation of the device in this invention.

Referring to FIG. 5, the photocell 24 is connected to an amplifier 40. The amplifier 40 amplifies the output of photocell 24 and feeds that output to a gate 41. Photocell 23 is connected to an amplifier 42, the output of which is also fed to gate 41. Oscillator 43 is connected to feed its output to gate 41 and to an amplifier 50. Amplifier 50 in the preferred embodiments shown in FIGS. 1 and 4 supplies the excitation voltage to the piezoelectric element 22 to cause the mirror 21 to sweep at a constant velocity. The output of gate 41 is fed to a digital counter 44 and may be also fed to an oscilloscope 45 to supply a visual indication of the output of gate 41. Referring to both FIGS. 3 and 5 the operation of the electronics portion of the angle encoder shown in FIG. 5 will be discussed. As an example of how an angle would be measured, consider the following:

A pulse from channel 1, consisting of photo detector 24 and amplifier 40, when applied to gate 41, will open gate 41 and permit the counter 44 to begin counting. A pulse from channel 2, consisting of photo detector 23 and amplifier 42, will close gate 41. The pulses $A_1$ and $A_2$ shown in FIG. 3 are disregarded since they at times may be partially covered by the mask 15. The interpolation is made between pulses $B_1$ and $C_2$. The gate 41 is opened by the leading edge of $B_1$ and closed by the leading edge of $C_2$. Thus the count into counter 44 will range from 0 to $\tau$ as the disc is rotated. Cross-angular information may be had by counting lines on the disc 30 or other points of coincidence. The number of pulses counted by counter 44 will then be a linear function of the angle $\psi$. The output signal fed to counter 44 repeats after each rotation of an angle equal to $\phi$; that is, the output is ambiguous with the number of ambiguities being equal to twice the number of opaque areas or lines on the movable disc 30. This ambiguity can be resolved by counting the number of pulse coincidences from a reference position or by the use of a cross-angle readout, such as a binary encoder mounted on the same movable disc 30. It is to be understood that other types of readout equipment such as pulse modulations, etc., may be substituted for the counter 44, amplifiers 40 and 42, and gate 41.

Variations of the optical system shown in FIG. 1 are possible. For example, the image inversion accomplished by lenses 10 and 11 might instead be done with dove prisms, roof prisms, or any of several other well known optical systems. The moving mirror 21 system might also be modified. Configurations including multiple mirror reflections are possible. An important property of this invention is that the readout signal indicates the relative position of the radial lines at two ends of the movable disc member 30's diameter. Eccentricity in the disc 30 mounting causes no relative displacement and therefore introduces no first order errors. Another important property is that the output signal indicates angle in units of time and so the device is relatively insensitive to amplitude fluctuations in the light source, photo detectors, amplifiers, etc. In addition, high precision clocks can be used to generate the time reference for the mirror drive and the clock pulses which are gated into the counter.

It is also obvious that although the embodiments shown in FIGS. 1 and 4 are concerned with a circular type movable member that a linear member may be used to achieve the same results. It is also to be noted that electrical signals which are measurements of angular or linear displacements may be differentiated by differentiators (not shown) to generate velocity and acceleration signals.

Although the invention has been described in detail above, it is not intended that the invention should be limited to the specific embodiments described but only in accordance with the spirit and scope of the appended claims.

We claim:
1. In combination:
    a movable member having a strip comprising a plurality of alternate transparent and opaque areas, said transparent areas being of uniform width and said opaque areas being of uniform width;
    first means illuminating said strip at a first predetermined point to provide a first image;
    second means illuminating said strip at a second predetermined point to provide a second image;
    means for scanning said first and second images;
    and means responsive to said first and second images for providing a signal indicating the relative times of occurrence of said first and said second images.

2. The combination as set forth in claim 1 wherein said means for scanning of said first and second images comprises: a mirror disposed to have projected thereon said first and second images; and means for periodically moving said mirror about a predetermined position.

3. In combination:
    a movable member having a first strip comprising a plurality of substantially identical alternately periodic transparent and opaque areas, and a second strip substantially parallel to said first strip comprising a transparent area;
    means illuminating a first portion of said first and second strips;
    means for receiving the light transmitted through said transparent areas of said first and second strips and for transmitting the light from said illuminated portion of said first strip to a second portion of said second strip and for transmitting the light from said illuminated portion of said second strip to a second portion of said first strip to illuminate said second portions of said first and second strips;
    and means for sensing the light transmitted by said second portions.

4. A time reference angle encoder having in combination:
    a movable member having a first strip comprising a plurality of substantially identical alternately periodic transparent and opaque areas and a second strip substantially parallel to said first strip comprising a transparent area;
    means illuminating a first portion of said first strip;
    means for receiving the light transmitted through the transparent areas of said first portion and for transmitting said light to a first portion of said second strip;
    means illuminating a second portion of said first strip adjacent to the first portion of said second strip;
    and means for sensing the light transmitted by said first portion of said second strip and said second portion of said first strip.

5. A time reference angle encoder comprising in combination:
    a member adapted to be movable in a plane about a central point;
    a plurality of substantially identical uniformly spaced lines forming a first strip having transparent and opaque areas whose edges substantially coincide with radii emanating from said central point;
    a second strip substantially transparent located adjacent to said first strip;
    means for illuminating at least a first portion of said first and second strips;
    means for receiving and projecting the light transmitted through said illuminated transparent areas of said first and second strips and for transmitting the light from said illuminated portion of said first strip to a second portion of said second strip and for transmitting the light from said illuminated portion of said second strip to a second portion of said first strip to illuminate said second portions; and
    means for sensing the light pattern transmitted by the transparent areas of said second portions.

6. In a time reference angle encoder the combination comprising:
    a member adapted to be rotatable in a plane about a central point;
    a first strip having a plurality of substantially identical uniformly spaced alternately transparent and opaque areas, whose edges substantially coincide with radii emanating from said central point;
    a second strip substantially parallel and adjacent to said first strip having a substantially transparent area;
    means for illuminating at least a first portion of said opaque and transparent areas of said first and second strips;
    fiber optical means for receiving the light transmitted through said transparent areas of said first and second strips and for transmitting the light from said first portion of said first strip to a second portion of said second strip and for transmitting the light from said first portion of said second strip to a second portion of said first strip to illuminate said second portions;
    and means for sensing the light pattern transmitted by the transparent areas of said second portions.

7. A time reference angle encoder comprising in combination:

a first movable element having a first and a second strip, said first strip comprising a plurality of substantially identical alternately opaque and transparent areas whose boundaries are substantially perpendicular to a predetermined direction of movement to be measured and said second strip having a substantially transparent area and located substantially parallel to said first strip;

means for illuminating a first portion of said first and second strips;

a second element supporting a light receiving and a light transmitting means, said light receiving means positioned adjacent said illuminated portions of said first and second strips to receive a pattern of projected light from said illuminated portions, said light transmitting means positioned adjacent a second portion of said first and second strips to transmit said received light patterns to said second portions of said first and second strips such that the pattern of said first portion of said first strip is projected onto said second portion of said second strip and said first portion of said second strip is projected onto said second portion of said first strip;

and separate light sensing members associated with each of said second portions at positions to receive light transmitted through the transparent portions thereof.

8. A time reference angle encoder comprising in combination:

a first movable element having a first and a second strip, said first strip comprising a plurality of substantially identical alternately opaque and transparent areas whose boundaries are substantially perpendicular to a predetermined direction of movement to be measured and said second strip having a substantially transparent area and positioned substantially parallel to said first strip;

means for illuminating at least a first portion of said first and second strips;

a second element supporting a fiber optical light receiving and transmitting means, said optical means positioned adjacent said illuminated portions of said first and second strips to receive a pattern of projected light from said illuminated portions and to transmit said received light patterns to at least a second non-illuminated portion of said first and second strips, said second portions being separated from said first portions by a predetermined spacing along said predetermined direction;

and separate light sensing members associated with each of said second portions at positions to receive the light transmitted through the transparent portions thereof.

9. A time reference angle encoder comprising in combination;

a rotatable disc-like member having a first periodic structure of substantially transparent and opaque optical areas whose edges are substantially perpendicular to the direction of allowable motion of said member and having a second structure of transparent material located substantially parallel to said first structure;

means for illuminating a first portion of said first and second structures;

at least one fiber optical member positioned adjacent said illuminated first portion of said first and second structures to receive light transmitted through the transparent areas thereof and to transmit said received light to other portions of said first and second structures such that the light received from said first portion of said first structure is transmitted to a second portion of said second structure and the light received from said first portion of said second structure is transmitted to a second portion of said first structure, said second portions being separated from said first portions by a predetermined distance;

and separate light sensing members associated with each of said second portions at positions to receive the light transmitted through the transparent portions thereof.

10. A time reference angle encoder comprising in combination:

a rotatable disc-like member having a first strip comprising a plurality of substantially identical alternate transparent and opaque areas and a second strip substantially parallel to said first strip comprising a transparent area;

a first means for optically projecting a first portion of said first strip;

a second means for optically projecting a first portion of said second strip;

a first optical means for receiving the optical pattern projected by said first strip and for transmitting said pattern and displaying it on a second portion of said second strip;

a second optical means for receiving the optical pattern projected by said second strip and for transmitting said pattern and displaying it on a second portion of said first strip;

and photoelectric means positioned to detect the patterns displayed at said second portions of said first and second strips.

11. An angle encoder comprising:

a first member;

a transparent disc adapted for rotation relative to said first member about a predetermined axis and having spaced thereon between a first and a second radius a plurality of substantially uniformly spaced alternately transparent and opaque areas whose boundaries are substantially along radii perpendicular to said axis and having a transparent area defined between said second and a third radius;

illuminating optical means for projecting illumination onto a first portion of said opaque and transparent areas between said first, second and third radii to project an optical pattern of said areas;

optical means positioned adjacent to said disc for receiving said optical patterns and for transmitting the pattern from between said first and said second radii to a second non-illuminated portion of said transparent area between said second and said third radii so as to project the image of said first portion of said alternately transparent and opaque areas onto said second portion of said transparent disc and for transmitting the pattern from between said second and said third radii to a second non-illuminated portion between said first and said second radii; and photoelectric means for detecting the motion between said projected patterns which move in a substantially radial direction on said discs with angular rotation of said disc.

12. A device as recited in claim 11 in which said photoelectric means are photo-resistant surfaces which are positioned to receive said projected light pattern with a substantially periodic illumination intensity which is a periodic function of the angular rotation of said disc, relative to said first member, about said axis, said photo resistant surfaces being connected to generate a signal which is a measure of the angular rotation of said disc relative to said first member.

References Cited

UNITED STATES PATENTS

| | | | |
|---|---|---|---|
| 3,024,986 | 3/1962 | Strianese et al. | 250—236 X |
| 3,054,901 | 9/1962 | Davidson | 250—233 |
| 3,219,830 | 11/1965 | Sharman et al. | |
| 3,244,895 | 4/1966 | Anderegg | 250—236 |

WALTER STOLWEIN, Primary Examiner

U.S. Cl. X.R.

250—219; 340—271